United States Patent [19]

Steward

[11] 3,909,927

[45] Oct. 7, 1975

[54] METHOD OF FORMING NUT AND PANEL ASSEMBLY

[75] Inventor: Joseph H. Steward, Bloomfield Hills, Mich.

[73] Assignee: Multifastener Corporation, Detroit, Mich.

[22] Filed: Dec. 23, 1974

[21] Appl. No.: 535,454

Related U.S. Application Data

[62] Division of Ser. No. 516,318, Oct. 21, 1974, which is a division of Ser. No. 414,469, Nov. 9, 1973, abandoned.

[52] U.S. Cl. ............. 29/526; 10/86 CL; 29/432; 29/453; 151/41.73
[51] Int. Cl.² ........................................ B23P 19/00
[58] Field of Search ....... 29/432, 432.1, 432.2, 453, 29/526, 558, 557; 10/72 R, 76 R, 85, 86 R, 86 CL, 86 F, 86 C, 86 W; 85/1 T; 151/37, 41.73

[56] References Cited
UNITED STATES PATENTS

| 1,872,616 | 8/1932 | Andren | 29/526 X |
|---|---|---|---|
| 1,873,869 | 8/1932 | Carr | 29/526 X |
| 2,419,862 | 4/1947 | Wales | 83/23 |
| 2,707,322 | 5/1955 | Strain et al. | 29/432 |
| 2,921,819 | 1/1960 | Rifkin | 308/22 |
| 3,187,796 | 6/1965 | Double | 151/41.73 |
| 3,213,914 | 10/1965 | Baumle et al. | 29/432 X |
| 3,381,362 | 5/1968 | Church et al. | 29/432.2 |
| 3,828,418 | 8/1974 | Laurizio | 29/453 X |

Primary Examiner—Victor A. Dipalma
Attorney, Agent, or Firm—Cullen, Settle, Sloman & Cantor

[57] ABSTRACT

A nut having a threaded bore including a cylindrical threaded portion through one end of the nut and a conical threaded portion opening through the opposed end of the nut for receiving the unthreaded portion of a bolt shank, without binding. The nut bore is formed by impacting one end of the nut blank with a cylindrical punch while the nut is supported on a die having an enlarged opening, breaking a cylindrical opening through the opposed end of the nut blank. The disclosed nut is a pierce nut and the conical bore portion opens through the pilot portion, eliminating the requirement for a countersink or counter-bore.

3 Claims, 5 Drawing Figures

FIG. 1
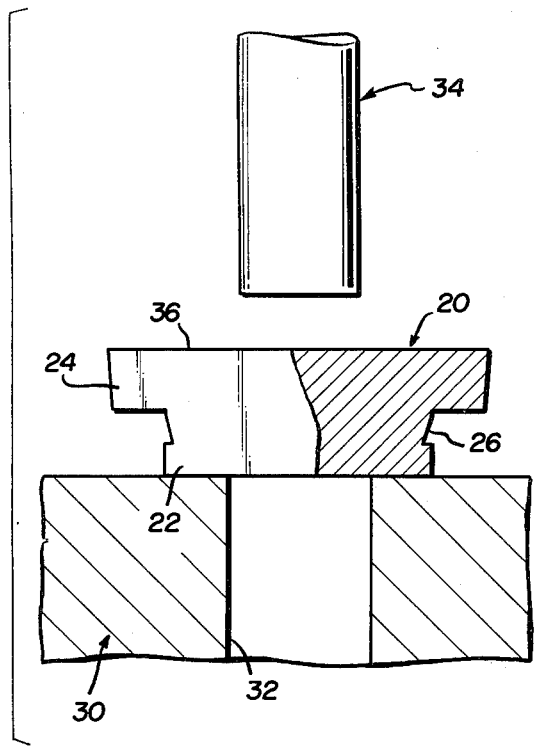
FIG. 2
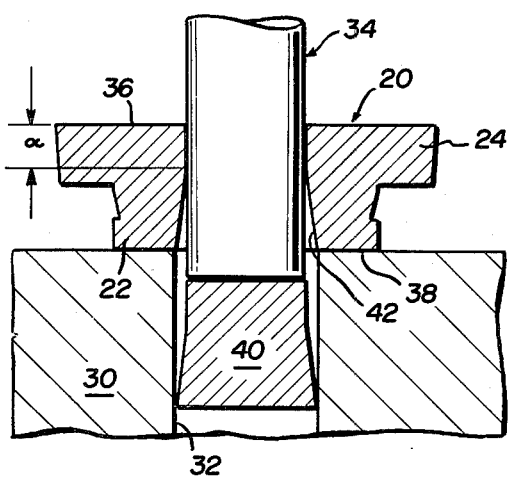
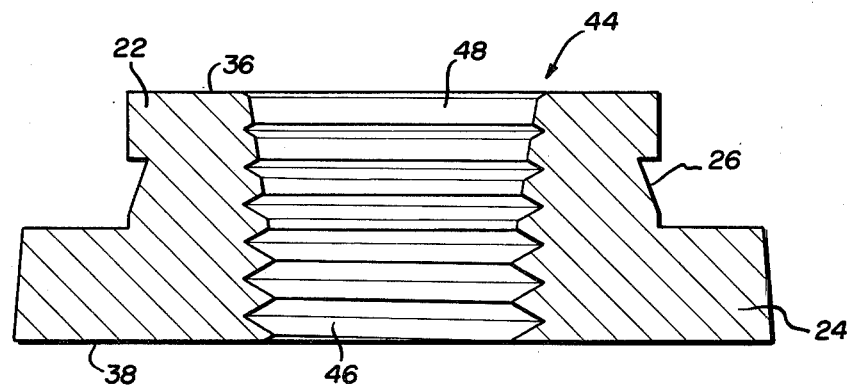
FIG. 3

METHOD OF FORMING NUT AND PANEL ASSEMBLY

This application is a divisional application of my copending application for United States patent, Ser. No. *516,318, filed Oct. 21, 1974, which application was a divisional application of my copending application for United States patent, Ser. No. 414,469, filed Nov. 9, 1973, now abandoned.

FIELD OF THE INVENTION

A nut having a configured threaded bore, particularly suitable for pierce and clinch nuts, and a method of making the improved nut.

Pierce and clinch nuts are used extensively in automotive and other applications to secure structural members to a supporting panel. Pierce and clinch nuts are generally secured to the supporting panel, simultaneously with forming of the panel configuration, in a press or die. The nut becomes integral with the panel and may be recessed in an embossment or channel. Pierce nuts, for example, generally have a projecting rectangular pilot portion which pierces an opening in the panel and the nut is simultaneously secured in the panel opening, in one stroke of the press. Pierce nuts are disclosed in U.S. Pat. Nos. 3,152,628 and 3,648,747, assigned to the Assignee of the instant application. Clinch nuts are secured in a pre-pierced panel opening, but may be otherwise similar.

After securement of the nut to the supporting panel, the structural member is generally secured to the panel by a conventional bolt which is threadably received in the nut and torqued in place. In many applications, the structural member is a relatively thin panel and the bolt includes an unthreaded portion adjacent the head, requiring a countersink or counterbore in the nut bore opening to accomodate the unthreaded portion of the bolt. The length of the unthreaded portion is substantially increased when the bolt includes an integral "Belville" washer, wherein the washer is formed integral with the bolt shank.

The forming of a countersink in the nut bore however requires a separate finishing operation which is especially costly in high volume nuts, such as pierce or clinch nuts. Pierce nuts are preferably formed in a continuous operation. First, the shape of the nut is rolled from extruded metal stock. The nuts are then cut from the rolled section. Next, the bore is pierced in a continuous operation, and finally, the nut bore is tapped. The pierce nut is now ready for installation. The addition of a countersink or counter-bore then requires a separate finishing operation.

SUMMARY OF THE INVENTION

The requirement of a countersink is eliminated in the improved nut of this invention by forming a nut bore having a conical opening sufficiently large to accomodate the unthreaded diameter of the bolt. Further, the improved nut bore of this invention is formed in one stroke of the piercing tool, eliminating the requirement of a separate finishing operation, such as a countersink or counter-bore.

The method of this invention includes supporting the nut blank on a die having a circular opening and impacting the nut with a high-speed cylindrical punch coaxially aligned with the die opening. The die opening has a diameter preferably about 13 to 18 percent greater than the diameter of the punch. Upon impact, the punch first forms a cylindrical opening which is approximately equal to the diameter of the cylindrical punch. Beginning at about one-third the thickness of the nut blank, a conical opening is broken through the nut blank having a major diameter generally equal to the die opening and opening toward the die. Finally, the configured nut bore is tapped, preferably with a conventional cylindrical tap, forming a continuous female thread in the nut bore. The threads in the conical opening are progressively incomplete truncated threads.

The nut formed by the method of this invention then includes a threaded cylindrical bore through one end of the nut, terminating and smoothly blending into a threaded conical bore having a major diameter adjacent the opposed nut end. The conical portion of the nut bore receives the threaded shank of the bolt and, upon final assembly, the conical bore portion receives the unthreaded portion of the bolt adjacent the head, without interference between the unthreaded bolt portion and the partially formed threads of the nut bore.

Other advantages and meritorious features of the disclosed invention will be more fully understood from the description of the preferred embodiments, the appended claims and the drawings, a description of which follows.

BRIEF DESCRIPTION OF THE DRAWINGS

FIG. 1 is an exploded side elevation, partially cross-sectioned, of the piercing apparatus illustrating the method of this invention;

FIG. 2 is a side elevation, similar to FIG. 1, showing the method of forming the configured bore;

FIG. 3 is a side cross-sectional view of one embodiment of the nut of this invention;

DESCRIPTION OF THE PREFERRED EMBODIMENTS AND METHOD OF THIS INVENTION

Figure 4:
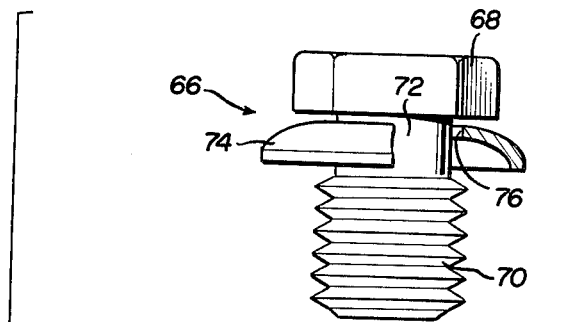
FIG. 4 is an exploded side elevation, partially cross-sectioned, of one embodiment of the panel assembly of this invention.

FIGS. 1 and 2 illustrate the method of forming the configured nut bore shown in FIG. 3 in a pierce or clinch nut 20. The nut is more fully disclosed in U.S. Pat. No. 3,152,628, which is incorporated herein by reference. The disclosed nut includes a projecting pilot portion 22, opposed flanges 24 and an undercut 26 in the side walls of the pilot portion which receive the opposed edges of the panel and secure the nut to the panel, as descried hereinbelow.

In the method of this invention, the nut blank 20 is supported on a die or anvil 30 and centered over a circular or cylindrical opening 32 in the die and beneath a cylindrical punch or pierce 34 which is coaxially aligned with the cylindrical opening 32 in the die. In the preferred embodiment, the flanged end 36 of the nut blank is then impacted with the cylindrical die 34, forming the configured nut bore 42, as shown in FIG. 2. The configuration of the nut bore formed by the method of this invention will depend upon the dimensional relation between the diameter of the punch 34 and the opening in the die 32.

In the preferred embodiment of the method of this invention, the diameter of the die opening is about 13 to 18 percent greater than the diameter of the punch 34. The preferred diameters will of course be dependent upon the diameter of the bolt. For a quarter inch bolt having an unthreaded diameter of 0.218 inches, for example, a punch having a diameter of about 0.200 inches and a die having an opening diameter of about 0.236 inches has been found suitable in actual practice. The configuration of the nut bore will also be dependent to some extent upon other factors, including the speed of the piercing tool or punch and the hardness of the nut. The piercing tool preferably has a relatively high-speed punch, for example about 250 to 500 strokes per minute. The punch is preferably cylindrical and the nut is preferably relatively hard. A suitable material for the pierce or clinch nut is machineable resulferized steel. A suitable material for the disclosed pierce nut is C1108 or C1118 steel having a hardness of 80 to 100, B scale Rockwell.

As shown in FIG. 2, impacting the flanged end 36 of the nut blank pierces a configured slug 40 from the nut blank, forming the preferred configuration of the nut bore. Under the conditions described above, the nut bore 42 includes a cylindrical aperture through the flanged end 36 of the nut and a conical opening through the pilot end 38. The axial length of the cylindrical bore portion, a, is preferably less than one-half or about one-third of the total axial length of the nut bore 42. This configuration will accomodate the unthreaded portion of a conventional bolt, as described.

The nut bore 42 is then threaded as shown in FIG. 3. The nut bore is preferably threaded with a conventional cylindrical tap, forming substantially complete female threads in the cylindrical threaded portion 46 and progressively incomplete truncated threads in the conical portion 48.

Figure 5:
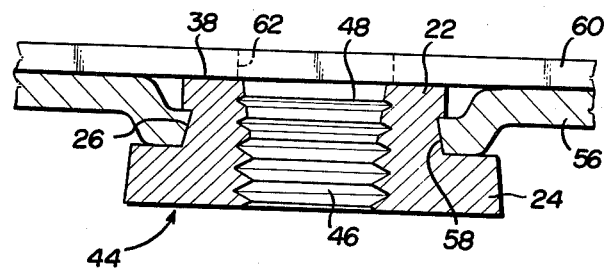
FIG. 5 is a side elevation, partially cross-sectioned, of the assembly shown in FIG. 4.
Figure 5:
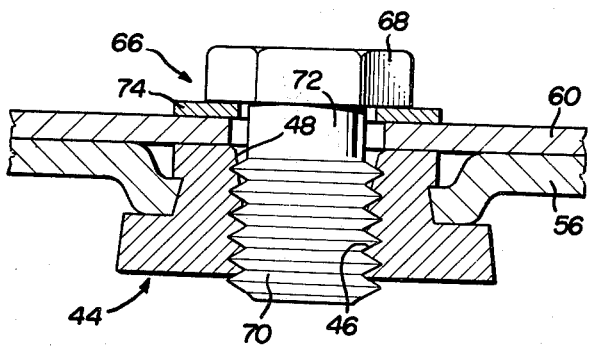

The use of the improved nut and the panel assembly of this invention is shown in FIGS. 4 and 5. As described in the above referenced United States patents and U.S. Pat. No. 2,707,322, also assigned to the Assignee of the instant application, the disclosed pierce nut may be secured to the supporting panel 56 in one stroke of the panel forming die, not shown. Where the nut 44 is utilized as a pierce nut, the pilot 22 serves as a punch, forming a hole in the panel and the panel edge 58 is received within the undercut 26, securing the nut to the panel. As described above, a pierce or clinch nut is normally utilized to secure a second structural member to the supporting panel by a conventional male fastener or bolt. In the disclosed panel assembly, the structural member is a relatively thin panel 60 having an aperture 62 coaxially aligned with the nut bore.

As described above, the shank of a conventional bolt normally includes an unthreaded portion adjacent the bolt head. Where a relatively thin panel 60 is to be secured to the supporting panel 56, the nut bore must accomodate the unthreaded portion of the bolt, presently requiring a countersink or counter-bore in the nut bore opening.

The bolt 66 shown in FIGS. 4 and 5 is a Belville-type bolt having an integral concave washer 74. The bolt includes a head portion 68, a threaded shank 70 and an unthreaded portion 72 adjacent the head 68. The Belville washer 74 is received on the shank, prior to rolling of the male thread and includes an opening 76 having an internal diameter less than the crest diameter of the threaded shank 70. The threading of the shank must therefore be stopped short of the axial extent of the Belville washer. This type of bolt therefore includes a relatively long unthreaded portion 72 which must be accomodated in the pilot end 38 of the nut. As shown in FIG. 5, the conical portion 48 of the threaded bore easily accomodates the unthreaded portion 72 of the Belville-type bolt and permits the bolt to be torqued into the nut bore, flattening the concave washer 74. The preferred embodiment of the nut and method of this invention therefore eliminates the requirement for a countersink or counter-bore.

Briefly, the method of this invention then includes supporting the nut blank 20 on a die 30 having a circular opening 32 and impacting the nut blank with a high-speed cylindrical punch 34 coaxially aligned with the die opening. The die opening preferably has a diameter approximately 13 to 18 percent greater than the diameter of the punch 34, thereby forming a cylindrical opening 46 at the face of the nut 38 impacted by the punch and a coaxially aligned conical opening 48 through the opposed end 36 of the nut having a major diameter generally equal to the die opening 32. Finally, the configured nut bore is tapped, forming a continuous female thread in the nut bore with partially formed, truncated threads in the conical portion 48 of the nut bore. The threads in the cylindrical portion 46 are preferably fully formed.

Continuing, the method of forming a nut and panel assembly additionally includes securing the nut to a panel by inserting the pilot portion 22 of the nut through a panel opening 58 and securing the nut in place as shown in FIG. 4. Finally, a bolt 66 having a head portion 68, a threaded shank portion 70 and an unthreaded shank portion 72 adjacent the head may be received in the conical opening 48 in the nut bore without interference between the unthreaded portion 72 of the bolt and the threaded nut bore.

It will be understood that the method of this invention is particularly applicable to pierce and clinch nuts as described above, however the method of this invention may also be utilized in other nut forms to eliminate the requirement for a countersink or counter-bore to accomodate an unthreaded bolt portion.

I claim:

1. A method of forming a nut and panel assembly, comprising the steps of:
   a. supporting the pilot of a nut blank having a projecting pilot portion and a lateral flange portion on an anvil having a circular opening; said nut being readily machineable and relatively hard,
   b. piercing the nut blank to form a bore by impacting the flanged end of said nut with a cylindrical punch coaxially alinged with said anvil opening, said anvil opening having a diameter at least 13 percent greater than said punch, thereby breaking-out a conical opening through the end of said nut pilot having a major diameter at said pilot end generally equal to the diameter of said anvil opening and forming a cylindrical bore portion at the impacted flanged end of said nut
   c. forming a continuous thread in said nut bore cylinder and conical portions,
   d. securing said nut to a panel by inserting said pilot end through a panel opening and securing the nut in place, and
   e. threading a bolt into said nut bore having a head portion, a threaded shank portion and an unthreaded shank portion adjacent said head, said unthreaded shank portion having a diameter greater than the minor crest diameter of said cylindrical bore portion and less than the major diameter of said conical portion adjacent said pilot end, by threading the shank portion of said bolt into said bore, through said pilot end and receiving said unthreaded shank portion of said bolt in said conical bore portion.

2. The method of forming a nut and panel assembly defined in claim 1, wherein said bore is threaded with a generally cylindrical tap having a major diameter approximately equal to the major diameter of said conical bore portion and forming fully formed female threads in said cylindrical portion and progressively incomplete truncated threads in said conical portion.

3. The method of forming a nut and panel assembly defined in claim 1, including securing a structural member having a hole greater in diameter than the unthreaded diameter of said bolt to said panel by inserting said bolt through said structural member hole and threading said bolt into said nut bore, through said pilot end of the nut.

* * * * *